United States Patent [19]

Alink et al.

[11] Patent Number: 4,512,759

[45] Date of Patent: Apr. 23, 1985

[54] DEVICE FOR THE SEPARATION OF PARTICLES FROM A STREAM OF GAS

[75] Inventors: Aloysius J. W. O. Alink, Zevenaar; Berend P. van Marle, Dieren, both of Netherlands

[73] Assignee: Thomassen International B.V., Netherlands

[21] Appl. No.: 465,089

[22] Filed: Feb. 9, 1983

[30] Foreign Application Priority Data

Feb. 23, 1982 [NL] Netherlands ......................... 8200725

[51] Int. Cl.³ ............................................. B04B 15/02
[52] U.S. Cl. ....................................... 494/14; 494/25; 494/40; 494/41; 494/60; 55/269; 55/409; 55/417; 55/DIG. 14
[58] Field of Search .................... 55/18, 269, 396, 400, 55/408, 409, 417, 418, DIG. 14, 1; 209/145; 494/5, 14, 22, 23, 25, 37, 39–41, 56, 60, 65

[56] References Cited

U.S. PATENT DOCUMENTS

| | | | |
|---|---|---|---|
| 1,917,792 | 7/1933 | Bowen | 494/37 |
| 2,578,485 | 12/1951 | Nyrop | 494/41 |
| 2,670,132 | 2/1954 | Podbielniak | 494/22 |
| 3,234,716 | 2/1966 | Sevin et al. | 55/417 |
| 3,674,206 | 7/1972 | Wendt, Jr. | 494/56 |
| 4,065,277 | 12/1977 | Dahlem | 55/418 |
| 4,298,159 | 11/1981 | Epper et al. | 494/37 |
| 4,298,359 | 11/1981 | Keller et al. | 55/269 |
| 4,325,825 | 4/1982 | Schütte | 494/14 |

FOREIGN PATENT DOCUMENTS 510286  11/1920  France ............................. 494/56

*Primary Examiner*—David L. Lacey
*Attorney, Agent, or Firm*—David H. Semmes; Warren E. Olsen

[57] ABSTRACT

A device for the separation of particles from a stream of gas by centrifugal action, comprising a driven rotatable hollow conically diverging body 1,2 and a feeding apparatus for directing the contaminated gas stream toward the inside wall of said body in the region of its narrowest portion so that the particles will be deposited against said wall and will gradually move toward the widest portion of said conical body; the stream of gas being controlled such that within the body a toroidal eddy forms for the recirculation of the contaminated gas stream.

5 Claims, 7 Drawing Figures

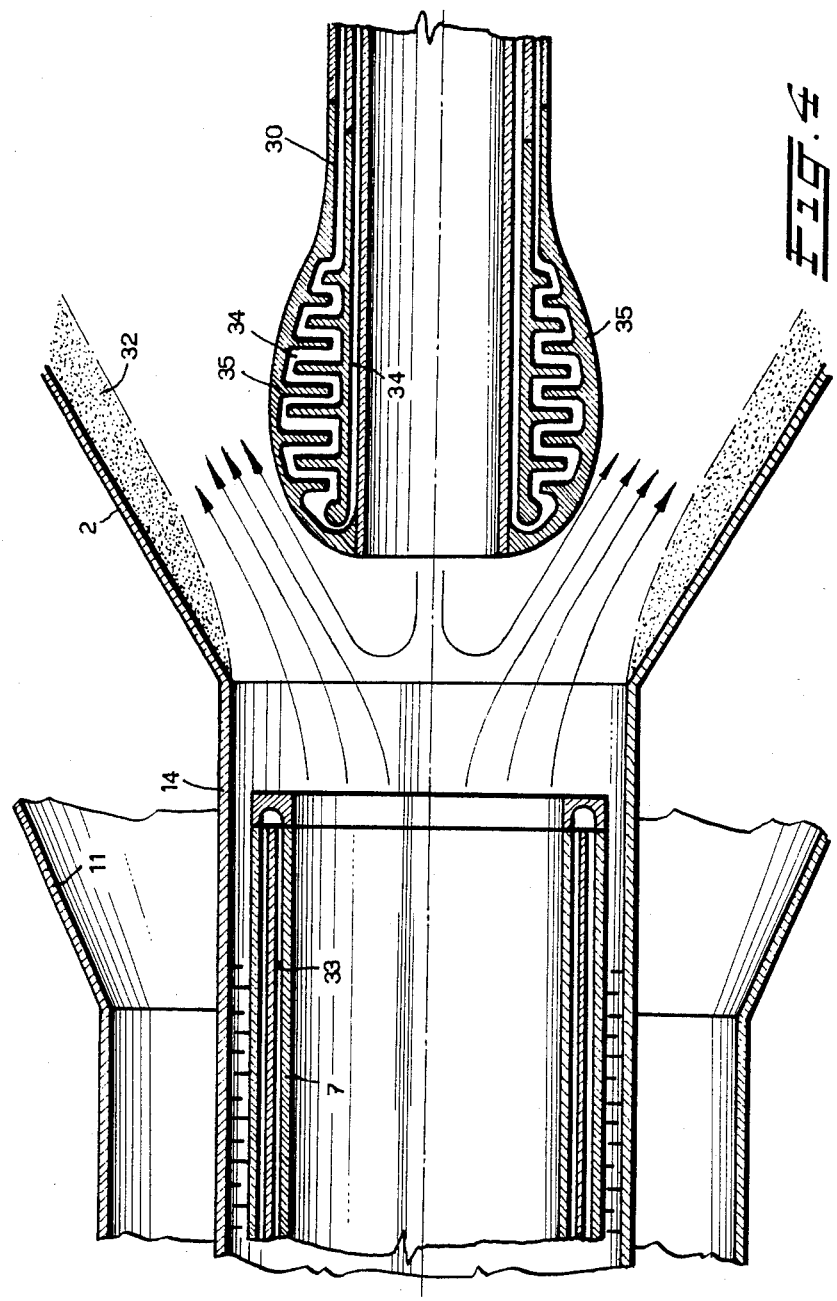

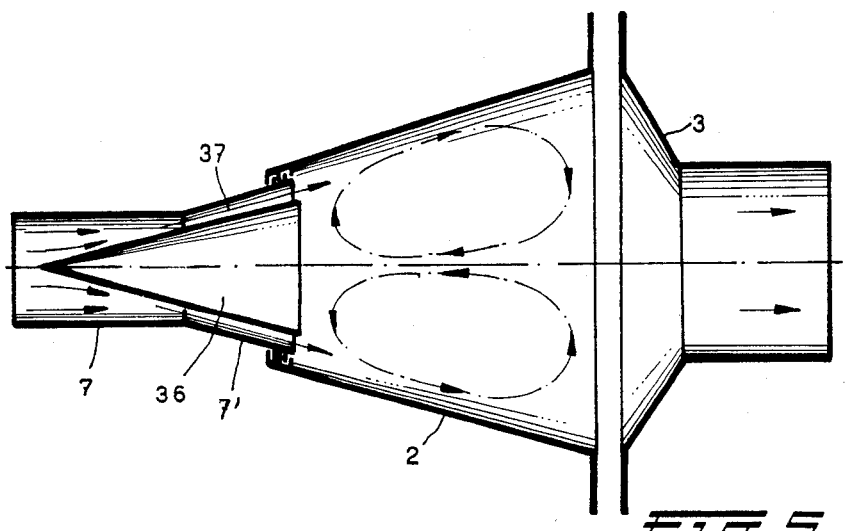
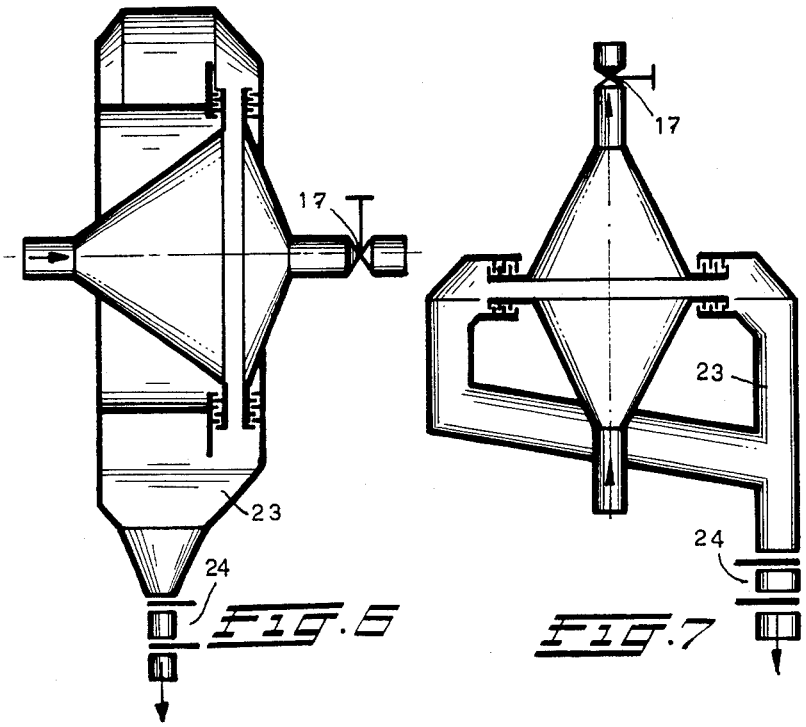

DEVICE FOR THE SEPARATION OF PARTICLES FROM A STREAM OF GAS

BACKGROUND OF THE INVENTION

1. Field of the Invention

The present invention relates to a process for the separation of particles from a stream of gas, using a centrifugal field, in which the incoming gas stream is passed along the inside wall of a rotating body, this inside wall having a conical shape, diverging in the direction of flow, with an angle of inclination such that the particles deposited against it continue to move in the direction of the base of the cone, where they are finally discharged along the circumference of the revolving body, while the purified gas stream flows out centrally at a point removed from the inlet.

2. Description of the Prior Art

Similar processes have been used in the art and are known for instance from French P.S. No. 711,371, the object of which is to separate entrained particles such as dust, flour, sawdust and similar substances from a stream of air in order to reduce environmental pollution.

With the known processes the separation percentage, particularly for very small and light particles, is not large, so that in the last resort it is necessary to repeat the purification several times or to employ special gas filters.

SUMMARY OF THE INVENTION

The object of the present invention is significantly to increase the separation percentage without the use of complex means and to achieve a virtually complete separation of particles with dimensions of 1 micrometer and greater.

This object is achieved in the process according to the invention, in that the inlet volume of gas to be purified per unit of time and/or the discharge volume of purified gas per unit of time is established and adapted to the volume of the revolving body in such a way that a toroidal eddy forms within the rotation body for recirculation of the gas after it has flowed along the inside wall. The flow pattern establishing itself within the revolving body promotes an increase in the residence time, so that all the particles present in the gas stream can be deposited against the inside wall of the revolving body.

The basic concept underlying the present invention is that the magnitude of the centrifugal force applied can be determined at will by the relationship between the speed of revolution and the diameter of the revolving body, while an enforced flow of the contaminated gas is generated along the inside wall of the body in combination with an adequate residence time so that virtually all the particles to be separated can be deposited on said wall.

In a further elaboration of the process according to the invention an adjustable part is split off from the incoming stream of gas and returned in counter-flow to the inlet point within the conical casing. Whereas in the known process according to French P.S. No. 711,371 the enforced flow along the inside wall of the revolving body is substantially brought about by passive aerodynamics, in the system according to the present invention the latter occurs in an active aerodynamically enforced manner.

The invention is further embodied in a device for the application of the process described above, comprising a rotationally symmetrical body provided with an inlet for the stream of gas to be purified, a device for the discharge of separated particles and an outlet for the purified gas, which body is set up so that it can rotate, while both the inlet and the outlet of the stream of gas are located on the axis of rotation and the casing of the body is substantially conical with the apex pointing toward the gas inlet, the device for the discharge of separated particles being mounted along the circumference of the (imaginary) base. According to the invention in this device a flow regulator is so mounted in the inlet and/or outlet of the gas stream that the pressure drop is substantially determined by this regulator.

This device is suitable for connection directly behind an apparatus in which for example pulverized coal or another substance is used and in which many small particles, for instance fly ash, are entrained in the outlet pipe. The device according to the invention can then ensure that these particles do not reach the atmosphere but are virtually retained.

The features of the present invention which are believed to be novel are set forth with particularity in the appended claims.

Other features and further advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 4 is a modified detail on an enlarged scale from the dust collector of FIG. 3.

FIG. 5 is a variant with a sliding regulator for the stream of gas through the device.

FIGS. 6 and 7 are a picture of the device for the discharge of separated particles in a horizontal and a vertical embodiment of the dust collector.

DESCRIPTION OF THE PREFERRED EMBODIMENTS

Figure 1:
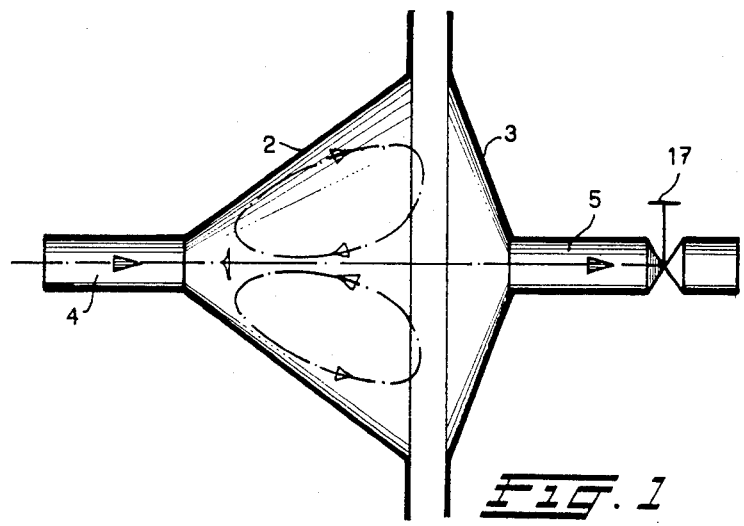
FIGS. 1 and 2 are higly simplified representations of the flow pattern occurring during operation of two variants.
Figure 2:
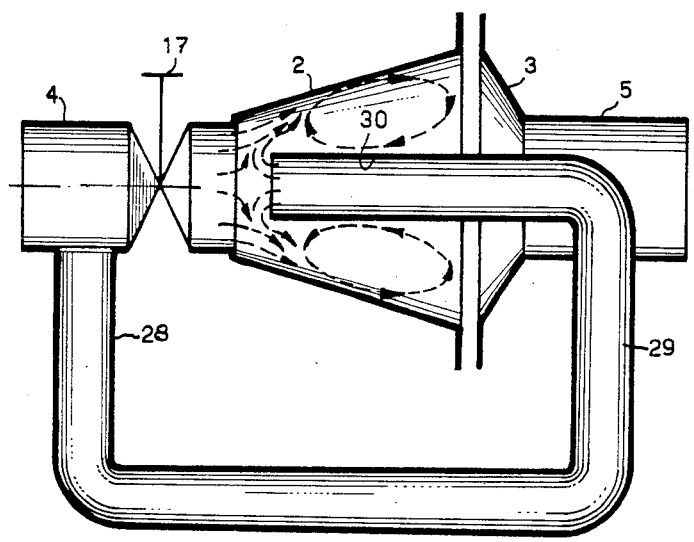

Referring now to FIGS. 1 and 2, the most important part of the device consists of a rotationally symmetrical body 1 comprising a conical casing 2 and a conical cover 3, the angle of inclination of cover 3 being greater than that of casing 2. By 'conical' is meant any surface of revolution which is described by a straight or a curved line. In other words the conical surfaces need not have a constant angle of inclination. The two conical elements 2 and 3 are positioned with their (imaginary) bases toward each other. The device also consists of an inlet means 4 for the gas stream to be purified and an outlet means 5 for the purified gas. Along the circumference of the imaginary base of the conical elements 2 and 3 is a device 6 for the discharge of separated particles, (see FIG. 3).

During operation a toroidal eddy will form within the body 1 with which the greater part of the gas stream which has passed along the inside wall of the casing will be returned for recirculation along the said inside wall.

For this purpose correct coordination is required between the supply of gas to be purified (via the inlet means 4) and the discharge of the purified gas (via the outlet means 5).

FIG. 1 shows the process and the device according to the invention in its most basic form. In the embodiment of FIG. 2 part of the incoming gas stream is returned in counterflow to the inlet 4 via a branch system to be described below.

Figure 3:
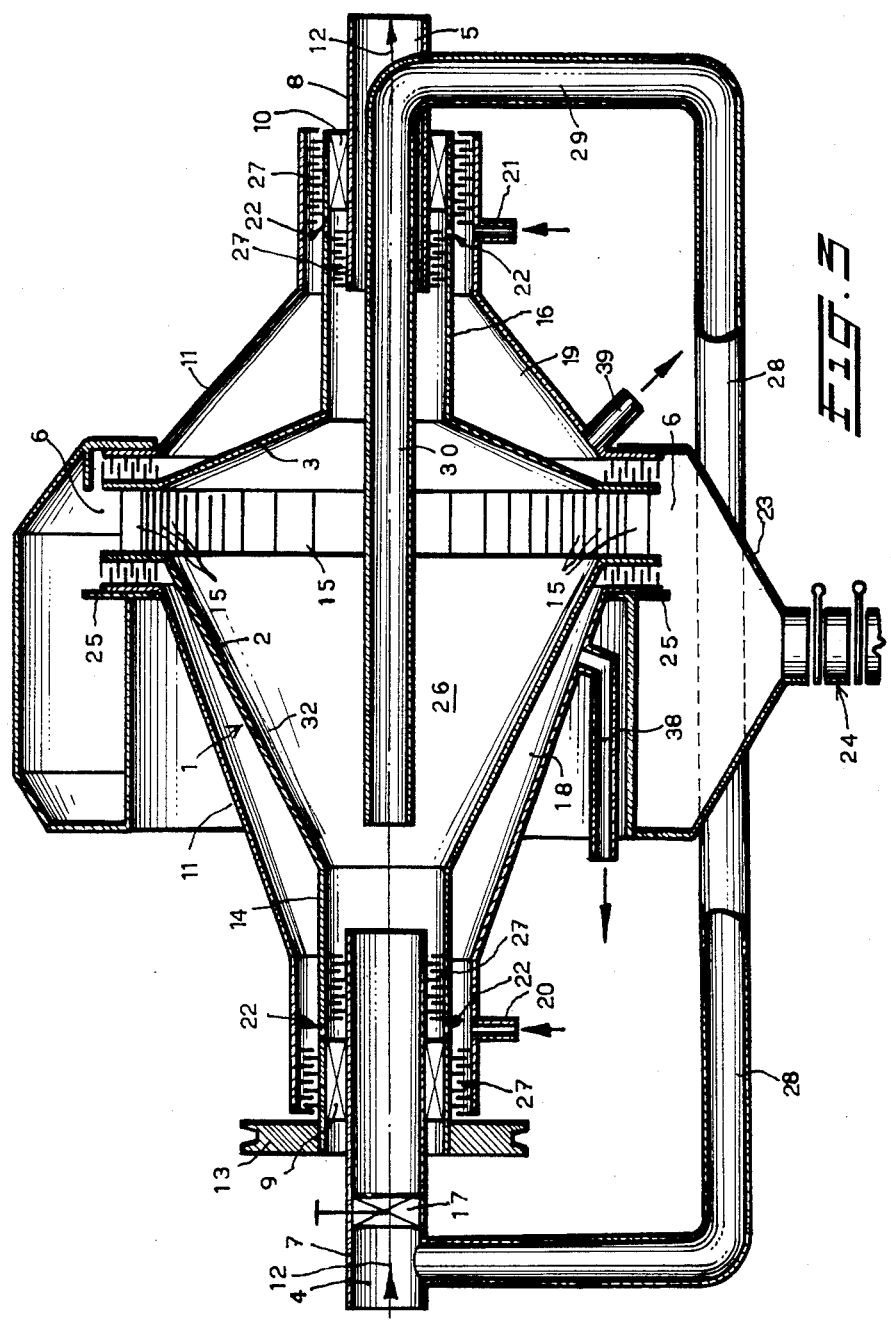
FIG. 3 is an axial longitudinal section through a highly diagrammatic representation of an embodiment of the dust collector according to the variant of FIG. 2.

Referring now to FIG. 3 the inlet means 4 and the outlet means 5 comprising respectively two fixed tubular structures 7 and 8, situated coaxially at some distance from each other. The casing 2 is mounted so that it can rotate around the inlet pipe structure 7, while the cover 3 is supported so that it can rotate on the outlet pipe structure 8. For this purpose bearings 9, 10 are present, which are represented in a highly diagrammatic manner.

A fixed housing 11 is mounted around the casing 2, the cover 3 and the two tubular structures 7, 8. This housing also forms part of the device 6 for the discharge of separated particles. Both the body 1 and the housing 11 are mounted symmetrically around a central axis 12, which also forms the axis of revolution of the body 1. For this purpose a drive pulley 13 is attached to a tubular extension piece 14 to the casing 2. This casing is supported via this extension piece 14 and the bearing 9 on the fixed tubular structure 7. The cover 3 is fixed to the casing via a number of strip-shaped bridges 15. The cover 3 is also provided with a tubular extension piece 16, which is supported via the bearing 10 on the fixed tubular structure 8.

Furthermore a valve 17 is mounted in the gas inlet 4 of the body 1 (see FIG. 3) for a purpose to be indicated below. Between the housing 11 on the one hand and the casing 2 and the cover 3 on the other hand are spaces, 18 and 19 respectively. An inlet 20 for a cooling fluid adjoins the space 18. A similar inlet 21 adjoins the space 19. Partial discharge of this fluid is achieved via one or more passage openings 22 in the extension pieces 14 and 16, so that part of the fluid can flow away via the bearings 9 and 10 respectively. The remainder of the cooling fluid can flow away via discharge openings 38 and 39. When the incoming stream of gas has an elevated temperature, efficient cooling of both the casing 2 and the cover 3 can be achieved by means of provisions 20–22.

Finally a chamber 23 is mounted around the discharge device 6, which is fitted with a discharge lock 24. Within the chamber 23 is an annular partition 25 which helps to ensure that particles emerging from the device 6 cannot return in the direction of the separation area 26 enclosed by the casing 2 and the cover 3. A number of labyrinth seals 27 are applied on either side of the rotating tubular extension pieces 14 and 16, and on either side of the discharge device 6.

The valve 17 is mounted in the tubular structure 7 at a point beyond a branch 28, so that part of the incoming (contaminated) gas stream can be diverted. The branch 28 leads downwards along the housing 11 and continues in a return line 29 which passes through the wall of the tubular structure 8. This line connects with a pipe 30 lying coaxially with the axis 12. Said pipe terminates inside the casing 2 opposite the inlet means 4 and constitutes a second gas inlet means so that a flow pattern is created during operation (see FIG. 2), in which the gas to be purified is passed along the inside wall of the casing 2.

As an example of a possible embodiment of the type of separator shown in FIGS. 1–3, the following data may be mentioned:

| | |
|---|---|
| length of the body 1 | = 2 m |
| radius ($R_1$) of pipe 14 | = 0.5 m |
| radius ($R_2$) of discharge device 6 | = 1.2 m |
| speed of body 1 | = 115 radians/sec |
| mass flow of gas | = 4 kg/s |
| pressure in area 26 | = 900 kPa |
| temperature in area 26 | = 1173° K. |
| specific gravity of gas stream | = 2.67 kg/m$^3$ |
| viscosity of gas stream | = 4.414 × 10$^{-5}$ kg/m.s. |
| max. tangent gas velocity | = 130 m/s |
| mean eddy velocity | = 38 m/s |
| exit velocity in pipe 7 | = 2.9 m/s |
| internal diameter of pipe 7 | = 0.8 m |
| residence time of gas in area 26 | = 3 sec |
| centripetal acceleration at $R_1$ | = 800 g |
| centripetal acceleration at $R_2$ | = 2000 g |
| degree of purification | = 99% of all particles is >1 micrometer ($\mu$m) |

During operation a layer 32 of deposited particles is formed against the inside wall of the casing 2. The combination of the centrifugal acceleration with the angle of inclination of the conical casing 2 creates an axial component of motion in the particles in the layer 32, so that these particles move toward the discharge device 6 and arrive at the chamber 23 in a constant stream. The lock 24 is provided in view of the excess pressure prevailing in the area 26. Said excess pressure is related to the apparatus placed in front of the dust collector (for example a fuel gasifier) and the apparatus after the dust collector (for example a gas turbine).

Referring now to FIG. 4 the detail portrayed shows the application of channels 33 and 34 in the tubular structure 7 and the pipe 30, for instance for the passage of a cooling fluid. The thickened end 35 of the pipe 30 has an effect on flow.

Referring now to FIG. 5 the tubular structure 7 is provided with a conically widening end 7'. In this end 7' an axially movable conical flow regulator 36 is placed coaxially with the center axis 12. This creates a possibility for regulating the volume of gas admitted per unit of time. The pressure drop over the entire purification device (dust collector) is substantially determined by the size of the clearance 37 between the end 7' and the regulator 36.

Referring now to FIGS. 6 and 7 in two variants the valve 17 is placed in the tubular structure 8 where, as in the embodiment of FIG. 5, no return of contaminated gas to the inlet means 4 is employed. The object of the valve 17 is the regulation of pressure within the area 26. The axis of revolution 12 is horizontal in FIG. 6 and vertical in FIG. 7, in order to indicate that the invention may be used in either variant.

It is pointed out that the gas stream to be purified, which enters via the inlet means 4, may have a high or low temperature, which will depend, for instance, on the apparatus from which the gas stream has come.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A device adapted for the separation of suspended particles from a stream of gas by means of centrifugal force, comprising:

a rotationally symmetrical body provided with an inlet means for the stream of gas to be purified, an outlet means for the purified gas; said body comprising a conical casing and a conical cover both being coaxial and with their apexes turned away from each other such that their opposed bases define a common circumferential and annular opening for discharge of separated particles, the axis of revolution coinciding with both apexes, the inlet means for the stream of gas being located at the apex of said casing, the outlet means for the purified gas being located at the apex of said cover valve means mounted within the inlet means, so that a part of the incoming gas stream may be diverted, and a branch pipe intersecting the gas inlet means prior to the valve means, so that a part of the incoming gas stream can be diverted into said branch pipe, said branch pipe being connected with a pipe lying coaxially with the axis of revolution of said rotating body, said coaxial pipe positioned within said body and having an end positioned with respect to the gas inlet means such that gas flowing out said end will be opposed to the gas flowing through said gas inlet means, so that said gas flowing out of said end creates a toroidal flow pattern of gas to be cleaned along the inside wall of said casing.

2. A device according to claim 1, in which the end of the coaxial pipe has an enlarged shape and is provided internally with a channel for a cooling fluid.

3. A device according to claim 1, wherein the angle of inclination of the cover is greater than that of the casing.

4. A device according to claim 1, in which the inlet means and the outlet means each comprises a pipe structure, situated coaxially at some distance from each other, while the casing is mounted so that it can rotate around the inlet pipe structure and the cover is supported so that it can rotate on the outlet pipe structure, a fixed housing being mounted around the casing, the cover and the two pipe structures, in which housing said circumferential and annular opening for the discharge of separated particles is positioned.

5. A device according to claim 8, said housing being positioned around said conical casing and said conical cover so as to define spaces for cooling fluid and said housing further including:

i. an inlet for cooling fluid in flow communication with one of said spaces and adjacent said inlet means for the stream of gas, and an inlet for cooling fluid and in flow communication with another of said spaces and adjacent said outlet means for purified gas;

ii. A plurality of bearings positioned intermediate said casing and said housing adjacent said inlet pipe and positioned intermediate said cover and said outlet pipe for purified gas;

iii. a plurality of passage openings for cooling fluid extending through said casing to said bearings adjacent said inlet pipe and through said cover to said bearing adjacent said outlet pipe, and iv. a plurality of discharge outlets for cooling fluid positioned in the housing and in flow communication with said spaces.

* * * * *